United States Patent
Homma

(10) Patent No.: US 11,734,475 B2
(45) Date of Patent: Aug. 22, 2023

(54) PERFORMANCE MEASUREMENT METHODOLOGY FOR CO-SIMULATION

(71) Applicant: Hitachi, Ltd., Tokyo (JP)

(72) Inventor: Ichiki Homma, West Bloomfield, MI (US)

(73) Assignee: HITACHI, LTD., Tokyo (JP)

( * ) Notice: Subject to any disclaimer, the term of this patent is extended or adjusted under 35 U.S.C. 154(b) by 323 days.

(21) Appl. No.: 17/322,575

(22) Filed: May 17, 2021

(65) Prior Publication Data

US 2022/0366098 A1   Nov. 17, 2022

(51) Int. Cl.
  *G06F 30/20*  (2020.01)
  *G06F 119/12* (2020.01)
  *G06F 119/02* (2020.01)

(52) U.S. Cl.
  CPC .......... *G06F 30/20* (2020.01); *G06F 2119/02* (2020.01); *G06F 2119/12* (2020.01)

(58) Field of Classification Search
  CPC ...... G06F 30/20; G06F 2119/12; G06F 30/33; G06F 30/367; G06F 2117/08
  See application file for complete search history.

(56) References Cited

U.S. PATENT DOCUMENTS

2002/0052725 A1* 5/2002 Wasynczuk ............. G06F 30/20
                                                                703/22
2020/0210536 A1    7/2020 Homma et al.

OTHER PUBLICATIONS

NPL Araki et al. Co-simulation of Multi-ECU Hardware/Software System Using Timing Back-Annotation Method ISOCC IEEE 2009 (Year: 209).*

* cited by examiner

*Primary Examiner* — Rehana Perveen
*Assistant Examiner* — Cuong V Luu
(74) *Attorney, Agent, or Firm* — Procopio, Cory, Hargreaves & Savitch LLP

(57) ABSTRACT

Example implementations involve systems and methods which can involve storing interface (I/F) communication activity records of a plurality of simulation engines during execution of a co-simulation, and for a subsequent execution of the co-simulation, replacing one or more of the plurality of simulation engines with a simulation engine repeater configured to reproduce I/F communication activity from the stored I/F communication activity records corresponding to the replaced one or more of the plurality of simulation engines during the subsequent execution of the co-simulation and to log a real time consumed for execution of the reproduced I/F communication activity in the subsequent execution and a simulation time consumed for execution of the reproduced I/F communication activity for each simulation step, the real time determined based on a real time difference between a start of each simulation step and completion of synchronization with a co-simulator bus at an end of each simulation step.

15 Claims, 13 Drawing Sheets

Profiler log on repeater 2

| sim time | real time |
|---|---|
| 0 | 0 |
| 1 | L21 |
| 2 | L22 |
| ... | ... |
| n | L2n |
| ... | ... | t ↓

| sim time | real time |
|---|---|
| 0 | 0 |
| 1 | L31 |
| 2 | L32 |
| ... | ... |
| n | L3n |
| ... | ... | t ↓

FIG. 9

PERFORMANCE MEASUREMENT METHODOLOGY FOR CO-SIMULATION

BACKGROUND

Field

The present disclosure is generally directed to hardware simulation systems, and more specifically, to co-simulation execution platforms.

Related Art

In the complicated automotive system areas such as advanced-driver-assistance-system (aka ADAS), there is a strong demand for the optimization of verification procedures for the embedded software of the system.

One of the known solutions to address such demand is "co-simulation", a multi-domain simulation connecting same or different type of simulators which represent each part of the simulation target e.g. electronic control unit (ECU), electronic circuit, mechanical plant, etc.

This kind of system provides a virtual platform that can run embedded software and verify its behavior without using any real hardware. Instead the virtual environment on personal computers (PCs) is utilized, so that software designers can check and verify the software fairness even before hardware platform development.

Meanwhile, software designers sometimes want to reexecute a previously executed simulation for software debugging to reproduce software symptoms encountered during previous executions, so that the engineer can check the symptoms and analyze which part of the software is wrong in case of malfunction.

In such a case, to reexecute the same simulation with the current co-simulation environment, designers must invoke all the simulators within the co-simulation platform even for situations in which designers want to debug only one of the target simulators in the co-simulation platform. For example, the designer may want to execute the simulator for the ECU which executes control software but not necessarily the simulator for the electric circuit or mechanical plant.

FIG. 2 illustrates an example of co-simulation platform with a prior performance measurement methodology, which can involve a timer 100, simulator 1 111, simulator 2 121, simulator 3 131, simulator 1 interface (I/F) (output 112, input 113), simulator 2 I/F (output 122, input 123), simulator 3 I/F (output 132, input 133) and co-simulation bus 105. The timer 100 measures the real time consumed during co-simulation execution on the platform. The timer 100 is reset to zero before the co-simulation execution, and starts when the execution starts. The timer 100 stops when the co-simulation execution stops, and the time at the point is the real time that the co-simulation platform consumed during its execution.

The simulator 1 111, simulator 2 121 and simulator 3 131 represent each part of the co-simulation model. The simulators 111/121/131 can be the same type of simulator or can be different from each other. Each simulator 111/121/131 has its own I/F input(s) and output(s), input 112 and output 113 for simulator 1 111, input 122 and output 123 for simulator 2 121, input 132 and output 133 for simulator 3 131. The input and output of each simulator can be a single signal or set of multiple signals depending on implementation.

Each simulator 111/121/131 retrieves its own input values from input 112/122/132 respectively, calculates and updates its own state with its input and generates output 113/123/133 respectively after finishing calculation and state updating, during whole execution of co-simulation at each time step.

The co-simulation bus 105 interconnects each simulator I/F 112/113/122/123/132/133 as specified by the co-simulation model and exchanges each value from an output of a simulator to an input of another simulator, during the entire execution of co-simulation at each time step.

The co-simulation procedure on the platform shown in FIG. 2 is as follows. Before co-simulation is invoked on the platform, the timer 100 is reset to zero to prepare for execution time measurement. After the timer 100 is reset to zero, simulator 111/121/131 become ready for co-simulation. The timer 100 will start counting just before the first step of the procedure as described below is executed.

FIG. 5 illustrates a timing chart for the co-simulation. When all the simulator 111/121/131 are ready for co-simulation, co-simulation time (sim time) is set to "0" in the timing chart. At this time, the output I/F values for each simulator are set to s1o0 for 112, s2o0 for 122 and s3o0 for 132 by simulator 111/121/131 respectively.

Next, the co-simulation bus reads each output I/F values above and passes them to the associated input I/F for each simulator along with the specified interconnection in the model. As a result, each input I/F value for simulator 111/121/131 are set to s1i0 for 113, s2i0 for 123 and s3i0 for 133 respectively.

After the initial procedure as described above, the sim time is set to "1", representing that the co-simulation has proceeded to the next time step. At this time, the output I/F values for each simulator are set to s1o1 for 112, s2o1 for 122 and s3o1 for 132 by simulator 111/121/131 respectively, as the results of state update and output value calculation with their input in each simulator for the sim time "1". Then, the co-simulation bus reads each output I/F values above and passes to the certain input I/F for each simulator along with the specified interconnection in the model, the same as described in the former step. As the results, each input I/F values for simulator 111/121/131 are set to s1i1 for 113, s2i1 for 123 and s3i1 for 133 respectively.

After the procedure described above, sim time is set to "2", representing that the co-simulation proceeds to the next time step. At this time, the output I/F values for each simulator are set to s1o2 for 112, s2o2 for 122 and s3o2 for 132 by simulator 111/121/131 respectively, as the results of state update and output value calculation with their input in each simulator for the sim time "2". The co-simulation continues in the same manner as described above until the sim time reaches the specific end timing, for example in this case, the sim time "n". When the sim time reaches to the end timing "n", simulator 111/121/131 and co-simulation bus 105 stop their calculation. Just after all the simulators and co-simulation bus in the platform have stopped, the timer 100 stops immediately and provides the measured time "Tn" as the co-simulation execution time in the real world.

The example of calculation methodology for execution performance of the co-simulation platform is as follows. One of the performance indexes for this kind of co-simulation platform is the "real time factor", also known as "RTF". It is the ratio of "consumed time in the real world/consumed time in the co-simulation", or "how much time in the real world is needed to run a certain simulation time in the virtual world". For example, 100 seconds in the real world is needed to run co-simulation for 1 second in the virtual world with RTF=100.

The RTF for the co-simulation of the platform can be calculated with the formula "RTF=Tn/n", where Tn is the measured time of the co-simulation platform by timer 100 and n is the time that the co-simulation stopped.

FIG. 3 illustrates a concept of the result which is derived from the co-simulation execution as described above. In the FIG. 3, RTF result 160 is derived from the performance measurement of the platform above. 161, 162 and 163 are the RTF of each single simulator 111, 121 and 131 respectively. The 161, 162 and 163 results are all unknown even if the result RTF 160 is provided with the measurement described above because, the result RTF 160 is derived from the measurement of the entire co-simulation execution and not specific for each simulator 111, 121 or 131.

Thus, the result RTF 160 does not represent any of the single simulator performance in the platform, and RTF for each single simulator 111, 121 and 131 are still all unknown. Accordingly, which of the single simulator RTF 161, 162 and 163 is the biggest bottleneck of the co-simulation platform is still unclear. With this situation, which of the simulator RTF 161, 162 or 163 has the same result as the result RTF 160 is also unknown even with the measurement above.

As described above, only the whole RTF of the co-simulation platform can be measured with the prior performance measurement methodology and the RTF for each single simulation engine is still unknown, which means the prior methodology cannot determine the bottle-neck simulator of the co-simulation platform.

Though some of the simulators come with its own performance profiling tool during its simulation execution. However, the bottle-neck of the co-simulation platform still cannot be determined even with the tool because such a tool is designed to determine not the execution performance of the simulator itself but the performance of each parts in the model on the simulator so that the designer can figure out which part of the model is the bottle-neck of the model.

Even through the tool mentioned above is designed to measure the performance of the simulator itself, the measurement result from the tool might be different from the actual performance because the execution of the simulator might have the effect from the other simulator during the execution of co-simulation, for example, over head of I/F communication and synchronization with the other simulators in the co-simulation.

SUMMARY

The example implementations involve a new methodology for performance measurement of each single simulation engine in co-simulation platform with higher accuracy to determine performance bottle-neck of the platform.

In example implementations described herein, there is an actual (physical) central processing unit (CPU) board, which includes a CPU, memory, timer and interface (I/F) logic to execute the target F/W to be tested and to communicate with a Host personal computer (PC) outside of the CPU board. The Host PC can involve an I/F to communicate with the CPU board above, an Input/Output (I/O) thread program which handles the actual communication between the CPU board and the Host PC, which involves an I/F communication function, pseudo control registers, and I/O ports, a model which emulates the behavior of the plant that cooperates with the F/W on the CPU board, and a co-simulation controller which manages the execution of the co-simulation of the whole system.

In the example implementations described herein, the storage(s) which records each value of I/F(s) for each simulator in each simulation time during the 1st co-simulation, called "I/F trace", the dummy module(s) for each simulator in the co-simulation platform, which can reproduce the former I/F communication activity by using the I/F trace which is preserved above, and which can replace the actual simulator in the re-execution term, and which also has a "profiler" to save how much real time the repeater consumes for every simulation step.

At the re-execution term, such re-execution is facilitated by replacing the simulators in the co-simulation platform with the dummy module(s) described above. except for the target simulator for which software engineers want to measure the singular execution performance.

With the example implementations described herein, the profiler in such repeater can save the performance execution log without having any effect or distortion by the other simulation engine so that the accurate performance measurement result can be obtained from the log data, which leads to more effective performance bottle-neck analysis for the co-simulation platform.

Aspects of the present disclosure can involve a method for evaluation of simulation engines, which can include storing interface (I/F) communication activity records of a plurality of simulation engines during execution of a co-simulation involving the plurality of simulation engines; and for a subsequent execution of the co-simulation, replacing one or more of the plurality of simulation engines with a simulation engine repeater configured to reproduce I/F communication activity from the stored I/F communication activity records corresponding to the replaced one or more of the plurality of simulation engines during the subsequent execution of the co-simulation and to log a real time consumed for execution of the reproduced I/F communication activity in the subsequent execution and a simulation time consumed for execution of the reproduced I/F communication activity for each simulation step, the real time determined based on a real time difference between a start of the each simulation step and completion of synchronization with a co-simulator bus at an end of the each simulation step; and evaluating performance of ones of the simulation engines not replaced by the simulation engine repeater based on the performance of all of the co-simulation in the subsequent execution.

Aspects of the present disclosure can involve a computer program, storing instructions for evaluation of simulation engines, which when executed by one or more processors can include storing interface (I/F) communication activity records of a plurality of simulation engines during execution of a co-simulation involving the plurality of simulation engines; and for a subsequent execution of the co-simulation, replacing one or more of the plurality of simulation engines with a simulation engine repeater configured to reproduce I/F communication activity from the stored I/F communication activity records corresponding to the replaced one or more of the plurality of simulation engines during the subsequent execution of the co-simulation and to log a real time consumed for execution of the reproduced I/F communication activity in the subsequent execution and a simulation time consumed for execution of the reproduced I/F communication activity for each simulation step, the real time determined based on a real time difference between a start of the each simulation step and completion of synchronization with a co-simulator bus at an end of the each simulation step; and evaluating performance of ones of the simulation engines not replaced by the simulation engine repeater based on the performance of all of the co-simulation in the subsequent execution. The computer program can be stored on a non-transitory computer readable medium.

Aspects of the present disclosure can involve a host computer connected, via an interface (I/F) to a central processing unit (CPU) board having a memory configured to store firmware, a CPU configured to execute the firmware, and a timer configured to calculate event occurrence timing during execution of the firmware, the host computer involving a processor configured to store interface (I/F) communication activity records of a plurality of simulation engines during execution of a co-simulation involving the plurality of simulation engines; and for a subsequent execution of the co-simulation, replace one or more of the plurality of simulation engines with a simulation engine repeater configured to reproduce I/F communication activity from the stored I/F communication activity records corresponding to the replaced one or more of the plurality of simulation engines during the subsequent execution of the co-simulation and to log a real time consumed for execution of the reproduced I/F communication activity in the subsequent execution and a simulation time consumed for execution of the reproduced I/F communication activity for each simulation step, the real time determined based on a real time difference between a start of the each simulation step and completion of synchronization with a co-simulator bus at an end of the each simulation step; and evaluate performance of ones of the simulation engines not replaced by the simulation engine repeater based on the performance of all of the co-simulation in the subsequent execution.

Aspects of the present disclosure can involve a system involving a central processing unit (CPU) board having a memory configured to store firmware, a CPU configured to execute the firmware, and a timer configured to calculate event occurrence timing during execution of the firmware, and a host computer connected, via an interface (I/F), to the CPU board, the host computer involving a processor configured to store interface (I/F) communication activity records of a plurality of simulation engines during execution of a co-simulation involving the plurality of simulation engines; and for a subsequent execution of the co-simulation, replace one or more of the plurality of simulation engines with a simulation engine repeater configured to reproduce I/F communication activity from the stored I/F communication activity records corresponding to the replaced one or more of the plurality of simulation engines during the subsequent execution of the co-simulation and to log a real time consumed for execution of the reproduced I/F communication activity in the subsequent execution and a simulation time consumed for execution of the reproduced I/F communication activity for each simulation step, the real time determined based on a real time difference between a start of the each simulation step and completion of synchronization with a co-simulator bus at an end of the each simulation step; and evaluate performance of ones of the simulation engines not replaced by the simulation engine repeater based on the performance of all of the co-simulation in the subsequent execution.

Aspects of the present disclosure can involve a system for evaluation of simulation engines, which can include means for storing interface (I/F) communication activity records of a plurality of simulation engines during execution of a co-simulation involving the plurality of simulation engines; and for a subsequent execution of the co-simulation, means for replacing one or more of the plurality of simulation engines with a simulation engine repeater configured to reproduce I/F communication activity from the stored I/F communication activity records corresponding to the replaced one or more of the plurality of simulation engines during the subsequent execution of the co-simulation and to log a real time consumed for execution of the reproduced I/F communication activity in the subsequent execution and a simulation time consumed for execution of the reproduced I/F communication activity for each simulation step, the real time determined based on a real time difference between a start of the each simulation step and completion of synchronization with a co-simulator bus at an end of the each simulation step; and means for evaluating performance of ones of the simulation engines not replaced by the simulation engine repeater based on the performance of all of the co-simulation in the subsequent execution.

BRIEF DESCRIPTION OF DRAWINGS

FIG. 9 illustrates an example of the log data format saved into the storage, in accordance with an example implementation.

DETAILED DESCRIPTION

Figure 1:
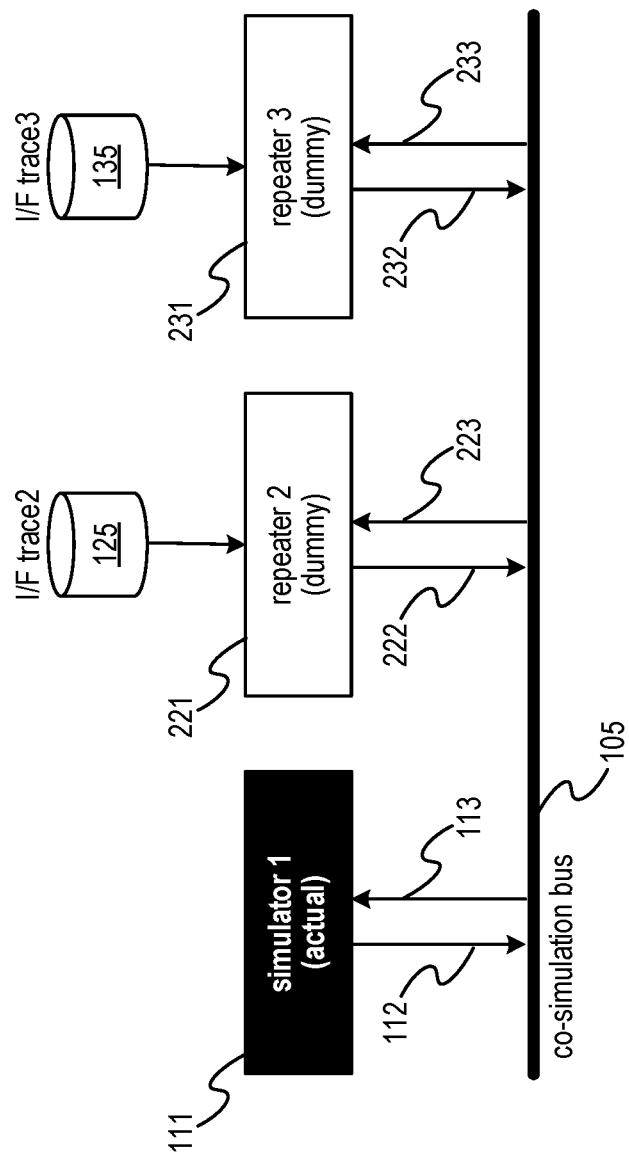
FIG. 1 illustrate an example of co-simulation platform with the new performance measurement methodology for a single simulation engine during re-execution, in accordance with an example implementation.

The following detailed description provides details of the figures and embodiments of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Embodiments as described herein can be utilized either singularly or in combination and the functionality of the embodiments can be implemented through any means according to the desired implementations.

Figure 4:
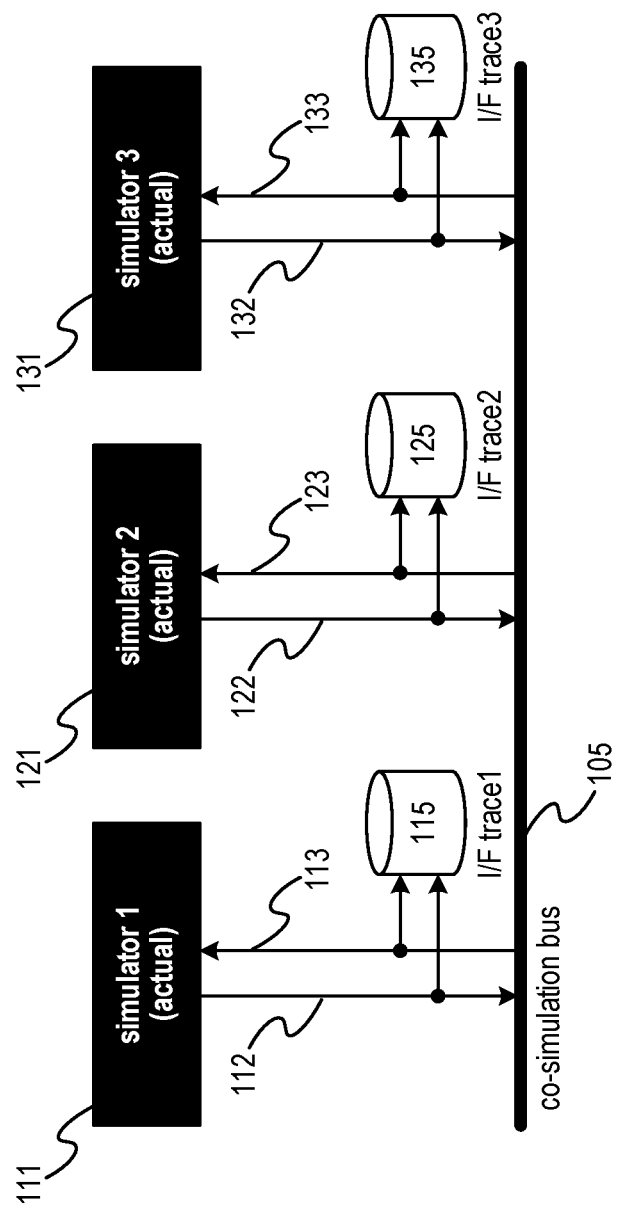
FIG. 4 is an example of co-simulation platform for capturing I/F trace data at the first-time execution, in accordance with an example implementation.

FIG. 4 is an example of co-simulation platform for capturing I/F trace data at the first-time execution, in accordance with an example implementation. The co-simulation platform involves simulator 1 111, simulator 2 121, simulator 3 131, simulator 1 I/F (output 112, input 113), simulator 2 I/F (output 122, input 123), simulator 3 I/F (output 132, input 133), co-simulation bus 105, storage for input and output trace of I/F on simulator 1 115, storage for input and output trace of I/F on simulator 2 125, storage for input and output trace of I/F on simulator 3 135.

Each storage for input and output trace of simulator I/F monitors activity and stores input and output I/F values every sim time step. For example, I/F trace1 115 monitors output I/F of simulator 1 112 and input I/F of simulator 1 113 and stores each value of 112 and 113 every sim time step. For the other I/F trace2 and I/F trace3, the functionality is the same with simulator 2 123 and simulator 3 131 respectively.

Figure 5:
FIG. 5 illustrates a timing chart for the co-simulation, in accordance with an example implementation.

The first co-simulation procedure on the platform shown in FIG. 4 is illustrated in FIG. 5. FIG. 5 illustrates a timing chart for the co-simulation, in accordance with an example implementation. When all the simulator 111/121/131 are ready for co-simulation, co-simulation time (sim time) is set to "0" in the timing chart. At this time, the output I/F values for each simulator are set to s1o0 for 112, s2o0 for 122 and s3o0 for 132 by simulator 111/121/131 respectively. Next, the co-simulation bus reads each output I/F values above and passes them to the certain input I/F for each simulator along with the specified interconnection in the model. As a result, each input I/F values for simulator 111/121/131 are set to s1i0 for 113, s2i0 for 123 and s3i0 for 133 respectively.

Figure 6:
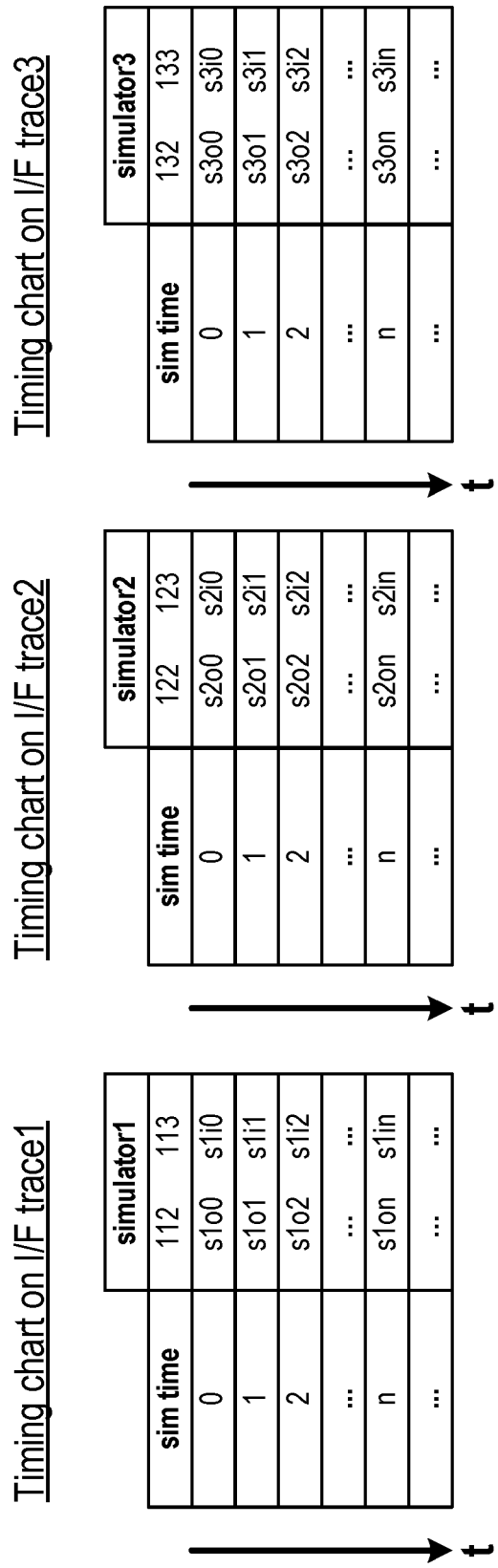
FIG. 6 is an example of the timing chart of each I/F activity for each simulator, in accordance with an example implementation.

Meanwhile, I/F trace1 115 monitors output 112 and input 113 of simulator 1 111 and stores their values. FIG. 6 is an example of the timing chart of each I/F activity for each simulator, in accordance with an example implementation. For the above example, the left most table represents the timing chart in I/F trace1 115, the middle table represents the timing chart in I/F trace2 125 and the right most table represents the timing chart in I/F trace3 135 respectively. As shown in FIG. 6, I/F trace1 115 stores value s1o0 as value of output 112 and value s1i0 as value of input 113 as of sim time "0" respectively. I/F trace2 125 monitors output 122 and input 123 of simulator 2 121, and stores value s2o0 as value of output 122 and value s2i0 as value of input 123 as of sim time "0" respectively. I/F trace3 135 monitors output 132 and input 133 of simulator 3 131, and stores value s3o0 as value of output 132 and value s3i0 as value of input 133 as of sim time "0" respectively.

After the initial procedure as described above, the sim time is set to "1", representing that the co-simulation is proceeded to the next time step. At this time, the output I/F values for each simulator are set to s1o1 for 112, s2o1 for 122 and s3o1 for 132 by simulator 111/121/131 respectively, as the results of state update and output value calculation with their input in each simulator for the sim time "1".

Then, the co-simulation bus reads each output I/F values above and passes to the certain input I/F for each simulator along with the specified interconnection in the model, same as described in former step. As a result, each input I/F values for simulator 111/121/131 are set to s1i1 for 113, s2i1 for 123 and s3i1 for 133 respectively.

Meanwhile, I/F trace1 115 monitors output 112 and input 113 of simulator 1 111 and stores their values. Same as former description in sim time "0", I/F trace1 115 stores value s1o1 as value of output 112 and value s1it as value of input 113 as of sim time "1" respectively. I/F trace2 125 monitors output 122 and input 123 of simulator 2 121, and stores value s2o1 as value of output 122 and value s2i1 as value of input 123 as of sim time "1" respectively. I/F trace3 135 monitors output 132 and input 133 of simulator 3 131, and stores value s3o1 as value of output 132 and value s3i1 as value of input 133 as of sim time "1" respectively.

After the procedure described above, the sim time is set to "2", representing that the co-simulation has proceeded to the next time step. At this time, the output I/F values for each simulator are set to s1o2 for 112, s2o2 for 122 and s3o2 for 132 by simulator 111/121/131 respectively, as the results of the state update and output value calculation with their input in each simulator for the sim time "2".

Meanwhile, I/F trace1 115, I/F trace2 125 and I/F trace3 135 store each input and output I/F value of their related simulator as of sim time "2", same as described previously. The co-simulation continues in the same manner as described above until sim time reaches to specific end timing, for example in this case, sim time "n". When sim time reaches to the end timing "n", simulator 111/121/131 and co-simulation bus 105 stops their calculation.

FIG. 1 is an example of co-simulation platform with the new measurement methodology for single engine performance of simulator 1 111 under re-execution, in accordance with an example implementation. The platform involves simulator 1 111, repeater 2 221 with profiler 225 inside, repeater 3 231 with profiler 235 inside, simulator 1 I/F (output 112, input 113), simulator repeater 2 I/F (output 222, input 223), simulator repeater 3 I/F (output 232, input 233), co-simulation bus 105, storage for input and output trace of I/F on simulator 2 125, storage for input and output trace of I/F on simulator 3 135.

Repeater 2 221 and repeater 3 213 are dummy module for replacing simulator 2 121 and simulator 3 131 respectively. Each repeater just reads its own storage for input and output trace of I/F every sim time and reproduce its output I/F activity along with former co-simulation execution in FIG. 4. Repeater 2 221 reproduces output I/F activity of simulator 2 121 and repeater 3 231 reproduces output I/F activity of simulator 3 131 respectively. Profiler 225 in the repeater 221 measures execution time of each sim time in every sim step and so as profiler 235 in the repeater 231. Each repeater has a lighter workload compared to the simulator that is to be replaced because the repeater has no other heavy calculation or status update procedure to execute.

Figure 7:
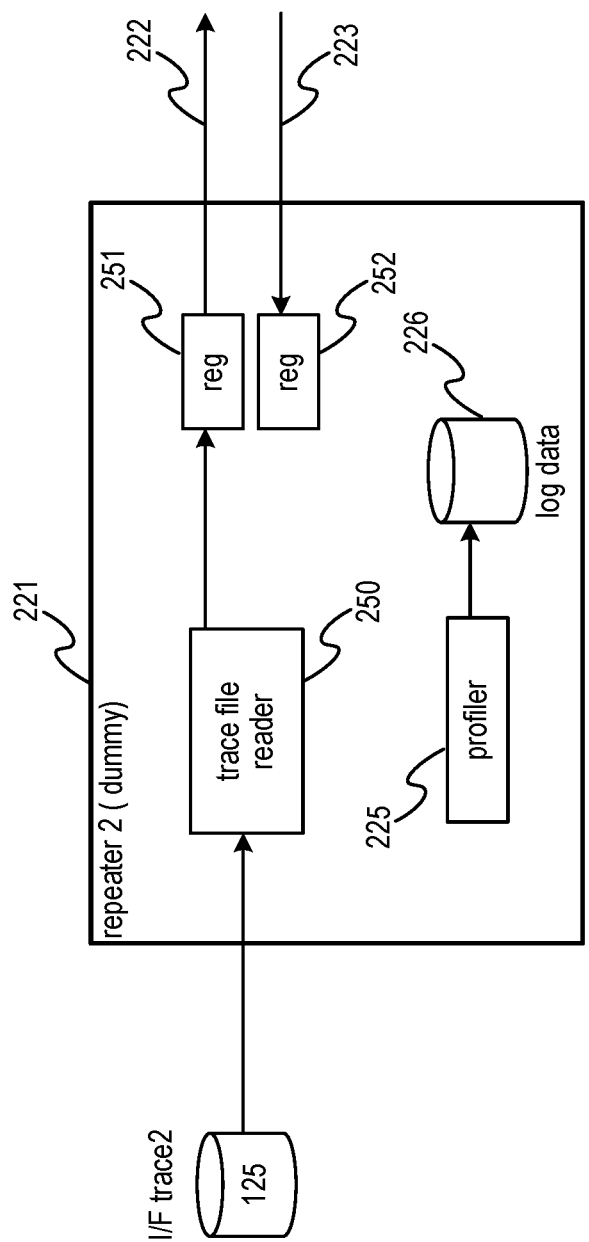
FIG. 7 is an example of the repeater implementation with a profiler of a performance measurement methodology, in accordance with an example implementation.

FIG. 7 shows an example implementation of the repeater 2 221. The repeater 2 221 consists of I/F trace2 125, output I/F 222, input I/F 223, trace file reader 250, output register 251, input register 252, profiler 225 and log data storage 226. Trace file reader 250 reads I/F trace data stored in I/F trace2 125 every sim time one by one in each sim step, and set output value to output register 251 to update value of output I/F 222 to reproduce the activity of the I/F in former simulation execution. Input register 252 reads value of input I/F 223 and set it into its register. The data in the register can be used for certain calculations or can be ignored and discarded. Profiler 225 in the repeater 221 measures execution time of each sim time in every sim step and stores it into its own log data storage 226 one by one. The implementation of the repeater 3 231 is the same as the example above.

Along with such simulator replacement, output 122 and input 123 I/F of simulator 2 121 are replaced with output 222 and input 223 of repeater 2 221 respectively, and output 132 and input 133 I/F of simulator 3 131 are replaced with output 232 and input 233 of repeater 3 231 respectively. Input(s) and output(s) of each repeater can be a single signal or set of multiple signals depending on implementation.

Each storage for input and output trace of simulator I/F is result of former co-simulation execution already described above in FIG. 4 and is used as timing chart for reproducing related simulator's input and output I/F activity. For example, I/F trace2 125 is used as timing chart for reproducing input and output I/F activity of repeater 2 221, and I/F trace3 135 is used as timing chart for reproducing input and output I/F activity of repeater 3 231.

The co-simulation bus 105 interconnects each simulator or repeater I/F 112/113/222/223/232/233 as specified by co-simulation model and exchange each value from an output of a simulator to an input of a simulator, during whole execution of co-simulation at each time step.

Figure 8:
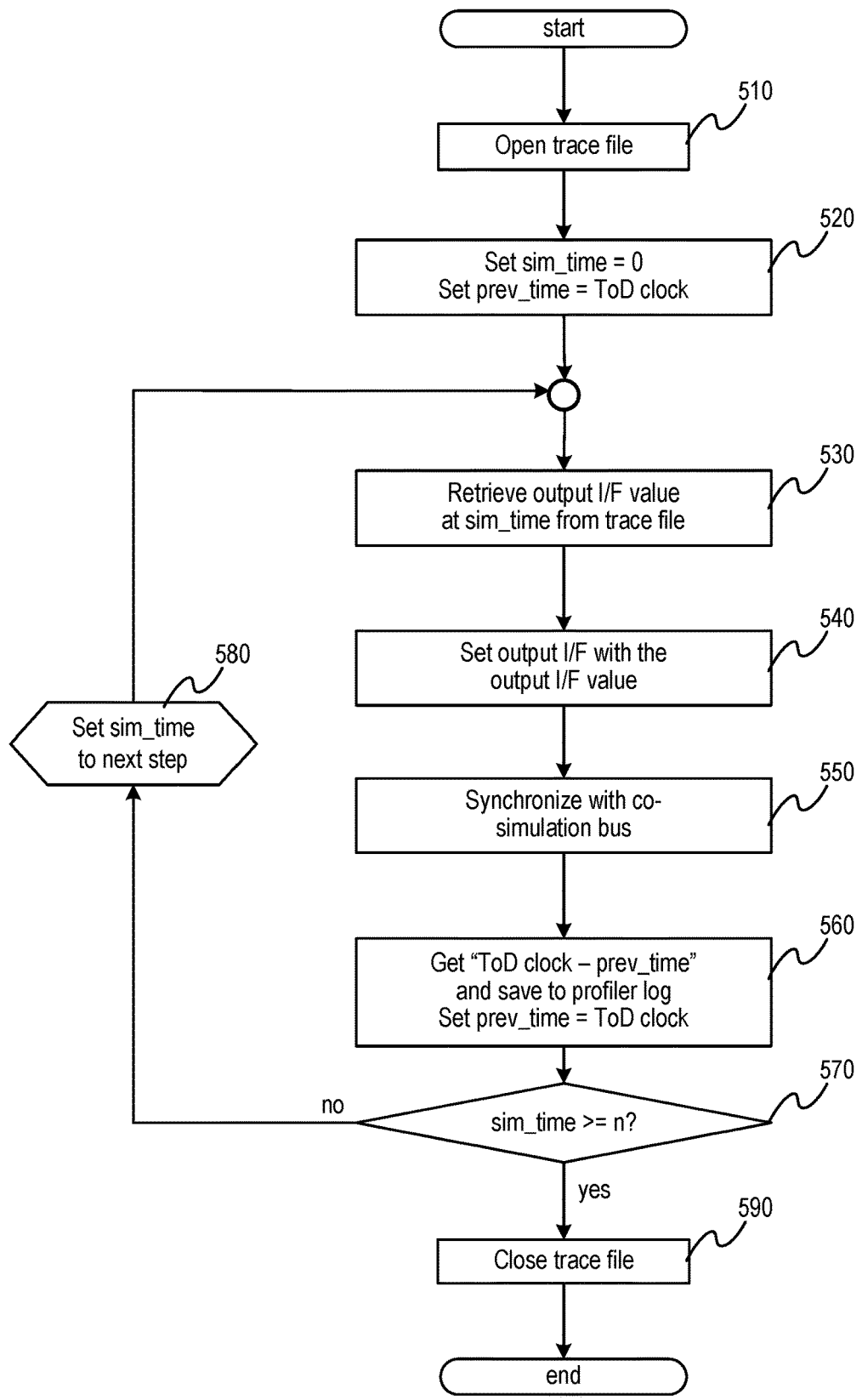
FIG. 8 illustrates an example flowchart of the repeater and profiler procedure, in accordance with an example implementation.

The co-simulation performance measurement procedure for simulator 1 111 under re-execution on the platform shown in FIG. 1 is as follows. FIG. 8 shows an execution flow chart for both repeater 2 221 and repeater 3 231 during the procedure, in accordance with an example implementation. As shown in the FIG. 8, the flow chart involves steps 510~590, which is described herein with respect to FIGS. 6, 7, and 9.

When the 2nd co-simulation re-execution is invoked on the platform, repeater 2 221 and repeater 3 231 open I/F trace2 125 and I/F trace3 135 which contain the timing chart of 1st co-simulation stored during former execution (step 510). After opening them, repeater 2 221 and repeater 3 231 set their variable "sim_time" to "0", "prev_time" to the current ToD (time of day clock) in the system, and are ready for co-simulation. Meanwhile, profiler 225 in the repeater 2 221 and profiler 235 in the repeater 3 231 set their variable "sim_time" to "0", "prev_time" to the current ToD (time of day clock) value in the system, and are ready for co-simulation (step 520). The implementation utilizes FIG. 6 as an example of a timing chart of each I/F activity for each simulator which must be reproduced during the re-execution of the former co-simulation.

When simulator 1 111, repeater 2 221 and repeater 3 231 are ready for co-simulation, co-simulation time (sim_time) is set to "0" in the timing chart. At this time, the output I/F values for simulator 1 111, repeater 2 221 and repeater 3 231 are set to s1o0 for 112, s2o0 for 222 and s3o0 for 232 by simulator 1 111, repeater 2 221 and repeater 3 231 respectively.

Next, the co-simulation bus reads each output I/F values above and passes to the certain input I/F for each simulator along with the specified interconnection in the model. As the results, each input I/F values for simulator 1 111, repeater 2 221 and repeater 3 231 are set to s1i0 for 113, s2i0 for 223 and s3i0 for 233 respectively.

After the initial procedure described above, sim_time is set to "1", representing that the co-simulation has proceeded to the next time step. At this time, the output I/F value for simulator 1 111 are set to s1o1 for 112 as the results of the state update and output value calculation in each simulator for the sim_time "1". The output I/F values for repeaters are set to s2o1 for 222 and s3o1 for 232 by repeater 2 221 and repeater 3 231 respectively, as the results of reading their own output trace value from storage for the sim_time "1" and reproducing them to their output I/F (steps 530 and 540).

Then, the co-simulation bus reads each output I/F values above and passes to the certain input I/F for each simulator along with the specified interconnection in the model. As the results, each input I/F values for simulator 1 111, repeater 2 221 and repeater 3 231 are set to s1i1 for 113, s2i1 for 223 and s3i1 for 233 respectively (synchronization in step 550).

After the bus synchronization above, profiler 225 in the repeater 2 221 and profiler 235 in the repeater 3 231 calculate the real time execution in this sim step by using the formula "current ToD clock−prev_time" and saves the time into their own log data storage. For example, profiler 225 in the repeater 2 221 saves it into log data storage 226 (step 560).

FIG. 9 illustrates an example of the log data format saved into the storage, in accordance with an example implementation. The left table in the FIG. 9 is the format for profiler 225 in the repeater 2 225, and the left table for profiler 235 in the repeater 3 235. Each table has pair of "sim_time" and "real time", which means the co-simulation at this "sim_time" consumes "real time" in the real world. For example, in above case, "L21=current ToD clock−prev_time" is the saved data at sim_time="1" for profiler 225 in the repeater 2 221, and "L31=current ToD clock−prev_time" is the saved data at sim_time="1" for profiler 235 in the repeater 3 231.

At this point, sim_time still has not reached the specific end time "n", the co-simulation continues with the step 530 again (steps 570 and 580).

After the procedure described above, sim_time is set to "2", representing that the co-simulation has proceeded to the next time step. At this time, the output I/F value for simulator 1 111 are set to s1o2 for 112 as the results of state update and output value calculation in each simulator for the sim_time "2". The output I/F values for repeaters are set to s2o2 for 222 and s3o2 for 232 by repeater 2 221 and repeater 3 231 respectively, as the results of reading their own output trace value from storage for the sim_time "2" and reproducing them to their output I/F (steps 530 and 540). The rest of the procedures are the same as step 550 and 560 described above. The co-simulation continues in the same manner as described above until sim_time reaches to specific end timing, for example in this case, sim time "n".

When sim_time reaches to the end timing "n", simulator 1 111, repeater 2 221 and repeater 3 231 and co-simulation bus 105 stop their calculation. Repeater 2 221 and repeater 3 231 close I/F trace2 125 and I/F trace3 135 respectively. Profiler 225 in the repeater 221 and profiler 235 in the repeater 231 close their own log data storage to preserve their profile data for later use.

Co-simulation performance measurement procedure for simulator 2 121 under re-execution is all the same as the procedure described above except the re-execution takes place with repeater 1 (not described in the FIG. 1), simulator 2 121 and repeater 3 231. In the same manner, co-simulation performance measurement procedure for simulator 3 131 under re-execution is all the same as the procedure described above except the re-execution takes place with repeater 1 (not described in the FIG. 1), repeater 2 221 and simulator 3 131.

Figure 10:
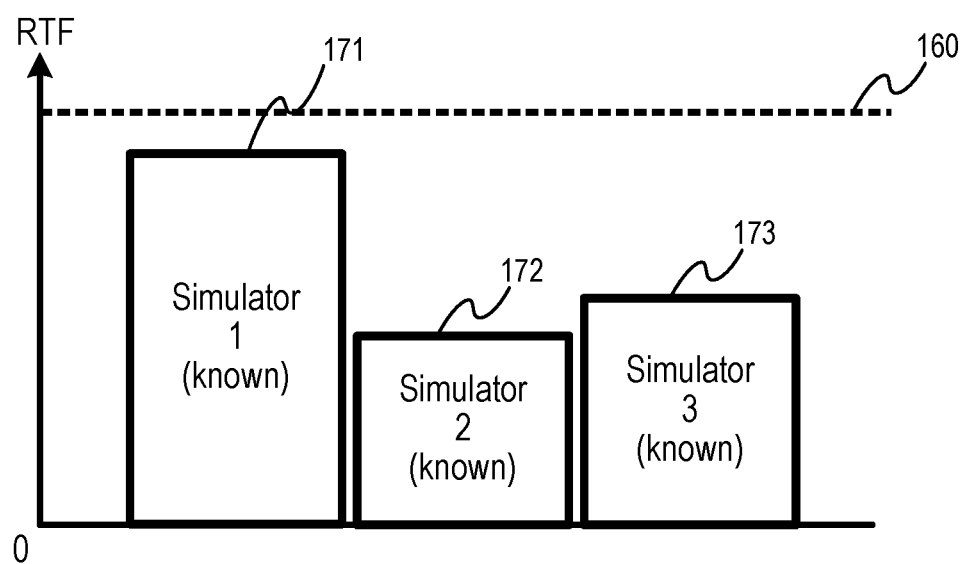
FIG. 10 is an example of performance measurement result derived from the data described in FIG. 9, in accordance with an example implementation.

Performance analysis procedure for each single simulator with profile data obtained from the platform described above as illustrated in FIG. 10. FIG. 10 shows result RTF for each single simulator in total average derived from the profiler log, where 171, 172 and 173 are RTF of single simulator 1 111, simulator 2 121 and simulator 3 131 respectively. 160 is the result RTF for whole co-simulation execution performance described formerly.

The RTF 171 of single simulator 1 111, for example, is calculated in the following manner. During the re-execution of the co-simulation as described above, profiler 225 in the repeater 221 and profiler 235 in the repeater 231 saves each profile data as described in FIG. 9. The left side table of the FIG. 9 is the data obtained by profiler 225 and the right is the data obtained by profiler 235. Both data is identically the same so both of them can be used for the calculation. In this example, profile data from profiler 225, the left table of FIG. 9 is used.

First, whole execution time for the re-execution of the co-simulation "S2" is required. To obtain this, total sum of the column "real time" in the left table in FIG. 9, provided by formula "S2=L21+L22+ . . . +L2n", is calculated.

Then, the RTF of single simulator 1 111 is derived with the formula "S2/n", where "n" is the same as whole sim_time during the co-simulation. Other ratios of real time consumed to simulation time consumed can be utilized in accordance with the desired implementation.

The RTF 172 of single simulator 2 121 and the RTF 173 of simulator 3 131 are both calculated in the same manner described above, using the profile data obtained from the appropriate re-execution co-simulation platform described before.

Figure 2:
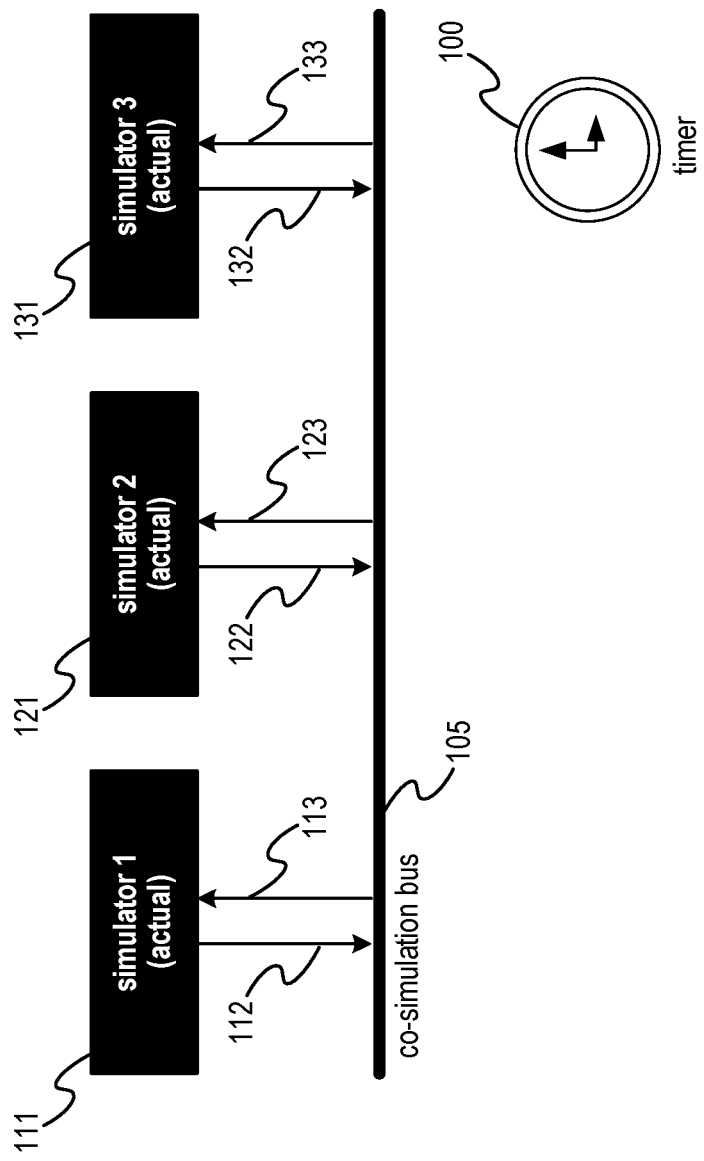
FIG. 2 is an example of co-simulation platform with a prior performance measurement methodology for whole simulation engines.
Figure 3:
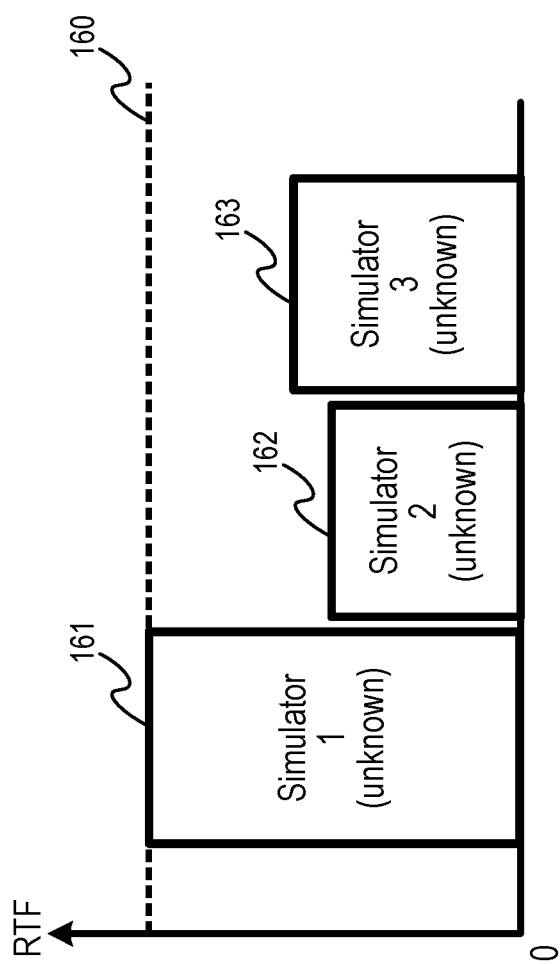
FIG. 3 is an example of performance measurement result derived from the platform with the prior methodology described in FIG. 2.

The results of FIG. 10 can be obtained by using all of the result RTF 171, 172 and 173, plotting into one bar graph so that software engineer can compare them each other and analyze which simulator in the co-simulation platform in FIG. 2 is the slowest, which means that the slowest is the bottle-neck of the platform. In this example, simulator 1 111 is the slowest and presumed as the bottle-neck of the platform, and is the target simulator for performance optimization.

As shown in FIG. 10, the software engineer can also plot the whole RTF of the co-simulation platform 160 into the bar graph above to compare with the result RTF of each simulator. The advantage of doing this comparison is that software engineer can confirm if there is gap between the whole RTF 160 and the slowest simulator (in this case, 171 for simulator 1 111). If there is a gap, it means there should be an issue in the co-simulation execution especially in parallelization area, because if all of the simulators 111, 121 and 131 are executed in parallel, there should be no gap between the whole RTF 160 and result RTF 171 for simulator 1 111. In this case, there is gap between 160 and 171 and it might be a sign of a parallelization issue for the co-simulation platform.

These profile data or derived result RTF can be treated as an accurate performance measurement result of single simulator1 111 because during the re-execution of the co-simulation, simulator 1 111 is the only real simulator and simulator 2 121 and simulator 3 131 are replaced with dummy repeater 2 221 and repeater 3 231 respectively.

The behavior of simulator 1 111 during the re-execution of the co-simulation is the same as that of during the 1st execution of the co-simulation because repeater 2 221 and repeater 3 231 reproduce the same I/F activity of the execution.

Further, the interference caused with repeater 2 221 or repeater 3 231 is negligible because these repeaters just reproduce their I/F activity using the former trace data described in FIG. 6, which means the calculation over head of each repeater can be treated as "zero" compared to that of simulator 1 111.

Figure 11:
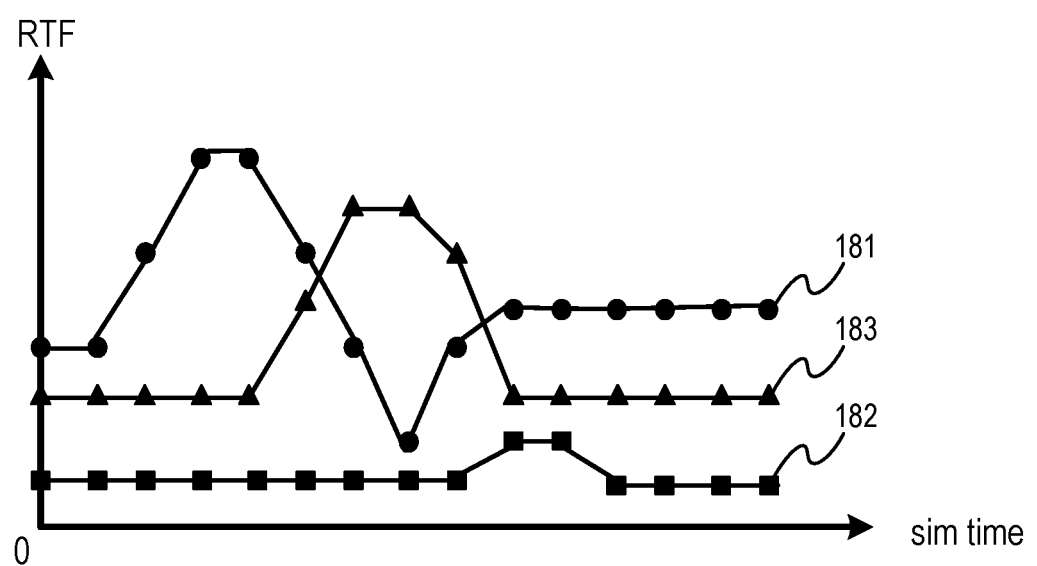
FIG. 11 illustrates the result for each single simulator in every sim step derived from the profiler log, in accordance with an example implementation.

FIG. 11 illustrates the result RTF for each single simulator in every sim step derived from the profiler log, where 181, 182 and 183 are periodical RTF of single simulator 1 111, simulator 2 121 and simulator 3 131 respectively.

The periodical RTF 181 of single simulator 1 111, for example, is calculated in the following manner:

During the re-execution of the co-simulation described above, profiler 225 in the repeater 221 and profiler 235 in the repeater 231 saved each profile data as described in the FIG. 9. The left side table of the FIG. 9 is the data obtained by profiler 225 and the right is the data obtained by profiler 235. Both data is identically the same so both of them can be used for the calculation. In this example, profile data from profiler 225, the left table of FIG. 9 is used.

First, the periodical RTF for each sim step is required. To obtain this, RTF for each sim time along with the profile data in the left table of the FIG. 9 is calculated with the formula "RTFk=L2k/1", where k=1~n. For example, periodical RTF at sim time 1 (=RTF1) is calculated with the formula "RTF1=L21/1". The reason dividing L21 by "1" is that the sim time difference between sim time 0 and sim time 1 is "1" and is all the same for each sim time 1~n. In the same manner, periodical RTF2, RTF3, . . . , RTFn can be calculated with L22/1, L23/1, . . . , L2n/1.

The periodical RTF 182 of single simulator 2 121 and the periodical RTF 183 of simulator 3 131 are both calculated in the same manner described above, using the profile data obtained from the appropriate re-execution co-simulation platform described before.

FIG. 11 can be obtained by using all the periodical RTF 181, 182 and 183, plotting into a one-line graph so that a software engineer can compare them to each other and analyze which simulator in the co-simulation platform in FIG. 2 is the slowest at the specific sim time, as the slowest is the bottle-neck of the platform at the sim time. In this example, the slowest simulator is floating among the three simulators time to time, indicating that the bottle-neck of the co-simulation depends on which simulator is the "busiest" for calculating and updating the status of the model running on it.

The advantage of plotting the line graph of periodical RTF for each simulator described above is that a software engineer can check if the bottle-neck of co-simulation is fixed to specific simulator or floating among simulators so that the engineer can focus on the appropriate simulator for a performance workaround.

As described with the example above, the example implementations described herein can obtain an accurate performance measurement result (RTF) for each single simulator, and such result comes with both result RTF for whole co-simulation average and periodical RTF for each sim time during the co-simulation, providing fundamental analysis data for eliminating the performance bottle-neck of the co-simulation platform and the workaround point for performance improvement. The example implementations can provide a performance measurement result for each single simulator in co-simulation with high accuracy, which cannot be obtained with the related art implementations.

Thus, the example implementations described herein can provide the new way of comparing the performance measurement result, enabling the software engineer to determine the bottle-neck of co-simulation.

The example implementations described herein introduce a new co-simulation methodology with higher efficiency especially for reexecution of former co-simulation. It can be used by both software and hardware development scene and not limited to the automotive area such as firmware development and control logic designing because the simulators described above can be replaced to any type of application software which has co-execution feature with certain I/F communication with others.

Figure 12:
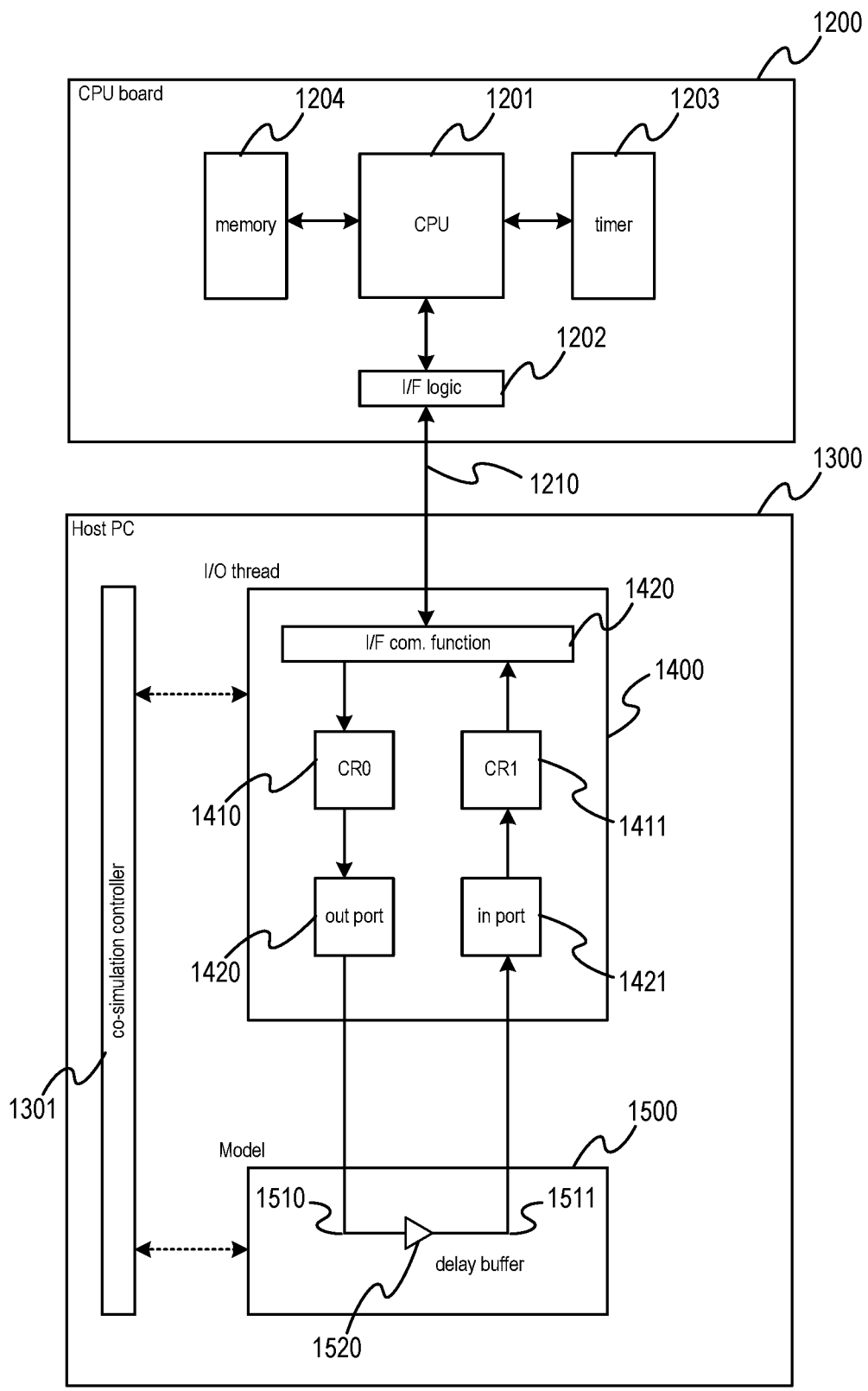
FIG. 12 illustrates an example of co-simulation platform, in accordance with an example implementation.

FIG. 12 illustrates an example of co-simulation platform, in accordance with an example implementation. The platform can involve a central processing unit (CPU) board 1200 which involves a CPU 1201, I/F logic 1202, timer 1203, memory 1204 and I/F path 1210. Host PC 1300 involves I/O thread 1420 which includes I/F communication function 1420, control register CR0 1410 and CR1 1411, out port 1420 and in port 1421, a model 1500 which involves input 1510, delay buffer 1520 and output 1511, and co-simulation controller 1301.

The CPU board 1200 is an execution platform for the test target firmware (F/W). The F/W is stored in the memory 1204 and executed by the CPU 1201 step by step for the F/W testing. The CPU board 1200 has I/F logic 1202, which establishes a connection between the CPU board 1200 and Host PC 1300 via I/F path 1210 so that it can send and/or receive certain data at certain timing, and also can communicate with co-simulation controller 1301 so that the co-simulation controller 1301 can manage the execution step of the CPU board 1200 during the co-simulation.

CPU board 1200 also has a timer 1203 which can measure the event occurrence time during F/W execution, such as control register read/write, and others. The detailed implementation of the timer 1203 is described further herein.

The I/O thread 1400 is a program process running on the Host PC 1300, and is connected to the CPU board 1200 via I/F path 1210. The path can be facilitated, for example, by Universal asynchronous receiver-transmitter (UART) serial communication, ether network or others, in accordance with the desired implementation.

The I/O thread 1400 also has its pseudo control registers CR0 1410 and CR1 1411 to communicate the model 1500 via out port 1420 and in port 1421. The F/W can send an output signal to the model 1500 through writing 0 or 1 to the CR0 1410 wherein the value is sent immediately to the plant model 1500 via out port 1420. The F/W can also receive input signal coming from the plant model 1500 by reading CR1 1411 which reflects the value of 0 or 1 of the input port 1421 immediately.

The I/O thread 1400 can communicate with the CPU board 1200 via the I/F path 1200 to write a new value into CR0 1410 or to read a value from CR1 1411. This communication and read/write access can be done by I/F communication function 1420.

The model 1500 presents a certain model which is connected to the I/O thread 1400 to facilitate the co-simulation. In this example, the model has input 1510 which is connected to the out port, output 1511 which is connected to the in port, and a delay buffer 1520 which reflects the value of its input 1510 to the value of its output 1511 with a certain time delay.

The co-simulation controller 1301 is a program process which manages the whole co-simulation execution procedure step by step as described herein.

The Host PC 1300 is an execution platform for all of the components of the system with the exception of the components on the CPU board 1200.

Figure 13:
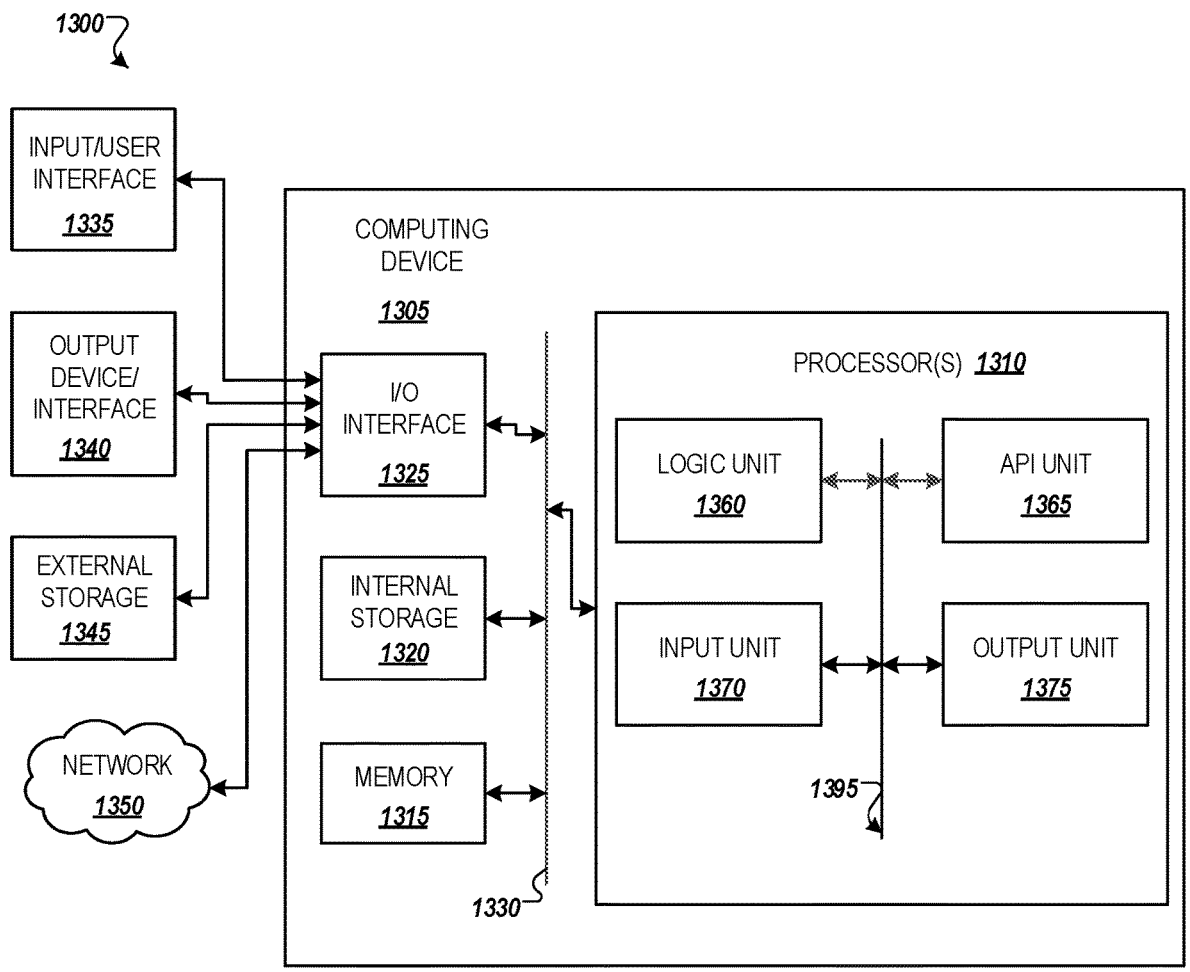
FIG. 13 illustrates an example computing environment with an example computer device suitable for use in some example implementations.

FIG. 13 illustrates an example computing environment with an example computer device suitable for use in some example implementations, such as a host computer 1300 as illustrated in FIG. 12. Computer device 1305 in computing environment 1300 can include one or more processing units, cores, or processors 1310, memory 1315 (e.g., RAM, ROM, and/or the like), internal storage 1320 (e.g., magnetic, optical, solid state storage, and/or organic), and/or IO interface 1325, any of which can be coupled on a communication mechanism or bus 1330 for communicating information or embedded in the computer device 1305. I/O interface 1325 is also configured to receive images from cameras or provide images to projectors or displays, depending on the desired implementation.

Computer device 1305 can be communicatively coupled to input/user interface 1335 and output device/interface 1340. Either one or both of input/user interface 1335 and output device/interface 1340 can be a wired or wireless interface and can be detachable. Input/user interface 1335 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1340 may include a display, television, monitor, printer, speaker, braille, or the like. In some example implementations, input/user interface 1335 and output device/interface 1340 can be embedded with or physically coupled to the computer device 1305. In other example implementations, other computer devices may function as or provide the functions of input/user interface 1335 and output device/interface 1340 for a computer device 1305.

Examples of computer device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1305 can be communicatively coupled (e.g., via I/O interface 1325) to external storage 1345 and network 1350 for communicating with any number of networked components, devices, and systems, including one or more computer devices of the same or different configuration. Computer device 1305 or any connected computer device can be functioning as, providing services of, or referred to as a server, client, thin server, general machine, special-purpose machine, or another label.

I/O interface 1325 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1300. Network 1350 can be any network or combination of networks (e.g., the Internet, local area network, wide area network, a telephonic network, a cellular network, satellite network, and the like).

Computer device 1305 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1310 can execute under any operating system (OS) (not shown), in a native or virtual environment.

One or more applications can be deployed that include logic unit 1360, application programming interface (API) unit 1365, input unit 1370, output unit 1375, and inter-unit communication mechanism 1395 for the different units to communicate with each other, with the OS, and with other applications (not shown). The described units and elements can be varied in design, function, configuration, or implementation and are not limited to the descriptions provided. Processor(s) 1310 can be in the form of hardware processors such as central processing units (CPUs) or in a combination of hardware and software units.

In some example implementations, when information or an execution instruction is received by API unit 1365, it may be communicated to one or more other units (e.g., logic unit 1360, input unit 1370, output unit 1375). In some instances, logic unit 1360 may be configured to control the information flow among the units and direct the services provided by API unit 1365, input unit 1370, output unit 1375, in some example implementations described above. For example, the flow of one or more processes or implementations may be controlled by logic unit 1360 alone or in conjunction with API unit 1365. The input unit 1370 may be configured to obtain input for the calculations described in the example implementations, and the output unit 1375 may be configured to provide output based on the calculations described in example implementations.

As described herein, host computer 1300 can be connected via the I/F path 1210 as described herein to the CPU board as illustrated in FIG. 12. As illustrated in FIG. 12, the CPU board 1200 can involve a memory 1204 configured to store firmware; a CPU 1201 configured to execute the firmware; and a timer 1203 configured to calculate event occurrence timing during execution of the firmware. The I/F path 1210 can be facilitated by a physical concrete I/F connection, such as by UART serial communication.

Processor(s) 1310 can be configured to store interface (I/F) communication activity records of a plurality of simulation engines during execution of a co-simulation involving the plurality of simulation engines; and for a subsequent execution of the co-simulation, replace one or more of the plurality of simulation engines with a simulation engine repeater configured to reproduce I/F communication activity from the stored I/F communication activity records corresponding to the replaced one or more of the plurality of simulation engines during the subsequent execution of the co-simulation and to log a real time consumed for execution of the reproduced I/F communication activity in the subsequent execution and a simulation time consumed for execution of the reproduced I/F communication activity for each simulation step, the real time determined based on a real time difference between a start of the each simulation step and completion of synchronization with a co-simulator bus at an end of the each simulation step; and evaluate performance of ones of the simulation engines not replaced by the simulation engine repeater based on the performance of all of the co-simulation in the subsequent execution as illustrated in FIGS. 1, 7 and 11.

Processor(s) 1310 can be configured to evaluate the performance of the ones of the simulation engines based on a comparison of an integrated value of a ratio of the real time consumed and the simulation time consumed for the each simulation step for an engine of the ones of the simulation engines, and another integrated value of the ratio of the real time consumed and the simulation time consumed for the each simulation step for other engines of the ones of the simulation engines as illustrated in FIGS. 7 to 11.

Processor(s) 1310 is configured to evaluate the performance of the ones of the simulation engines is conducted based on a ratio of the real time consumed and the simulation time consumed for the each simulation step of each of the ones of the simulation engines as illustrated in FIGS. 7 to 11.

Processor(s) 1310 is configured to identify a most time-consuming one of the ones of the simulation engines based on comparing a ratio of the real time consumed and the simulation time consumed for each of the ones of the simulation engines at a specified simulation timing as illustrated in FIGS. 7 to 11.

Processor(s) 1310 is configured to evaluate the performance of the co-simulation based on comparing a ratio of the real time consumed and the simulation time consumed for all of the co-simulation, and a ratio of the real time consumed and the simulation time consumed for each of the plurality of simulation engines as illustrated in FIGS. 7 to 11.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In embodiments, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Embodiments may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the embodiments are not described with reference to any particular programming language. It will be appreciated that a variety of programming languages may be used to implement the teachings of the embodiments as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the embodiments may be implemented using circuits and logic devices (hardware), while other aspects may be implemented using instructions stored on a machine-readable medium (software), which if executed by a processor, would cause the processor to perform a method to carry out implementations of the present application. Further, some embodiments of the present application may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other embodiments of the present application will be apparent to those skilled in the art from consideration of the specification and practice of the teachings of the present application. Various aspects and/or components of the described embodiments may be used singly or in any combination. It is intended that the specification and embodiments be considered as examples only, with the true scope and spirit of the present application being indicated by the following claims.

What is claimed is:

1. A method for evaluation of simulation engines, the method comprising:
   storing interface (I/F) communication activity records of a plurality of simulation engines during execution of a co-simulation involving the plurality of simulation engines; and
   for a subsequent execution of the co-simulation, replacing one or more of the plurality of simulation engines with one or more corresponding simulation engine repeaters configured to reproduce I/F communication activity from the stored I/F communication activity records corresponding to the replaced one or more of the plurality of simulation engines during the subsequent execution of the co-simulation and to log a real time consumed for execution of the reproduced I/F communication activity in the subsequent execution and a simulation time consumed for execution of the reproduced I/F communication activity for each simulation step, the real time determined based on a real time difference between a start of the each simulation step and completion of synchronization with a co-simulator bus at an end of the each simulatior step; and
   evaluating performance of ones of the simulation engines not replaced by the simulation engine repeater based on the performance of all of the co-simulation in the subsequent execution.

2. The method of claim 1, wherein the evaluating the performance of the ones of the simulation engines is based on a comparison of an integrated value of a ratio of the real time consumed and the simulation time consumed for the each simulation step for an engine of the ones of the simulation engines, and another integrated value of the ratio of the real time consumed and the simulation time consumed for the each simulation step for other engines of the ones of the simulation engines.

3. The method of claim 1, wherein the evaluating the performance of the ones of the simulation engines is conducted based on a ratio of the real time consumed and the simulation time consumed for the each simulation step of each of the ones of the simulation engines.

4. The method of claim 1, further comprising identifying a most time-consuming one of the ones of the simulation engines based on comparing a ratio of the real time consumed and the simulation time consumed for each of the ones of the simulation engines at a specified simulation timing.

5. The method of claim 1, further comprising evaluating the performance of the co-simulation based on comparing a ratio of the real time consumed and the simulation time consumed for all of the co-simulation, and a ratio of the real time consumed and the simulation time consumed for each of the plurality of simulation engines.

6. A non-transitory computer readable medium, storing instructions for evaluation of simulation engines and executed by one or more processors, the instructions comprising:
   storing interface (I/F) communication activity records of a plurality of simulation engines during execution of a co-simulation involving the plurality of simulation engines; and
   for a subsequent execution of the co-simulation, replacing one or more of the plurality of simulation engines with one or more corresponding simulation engine repeaters configured to reproduce I/F communication activity from the stored I/F communication activity records corresponding to the replaced one or more of the plurality of simulation engines during the subsequent execution of the co-simulation and to log a real time consumed for execution of the reproduced I/F communication activity in the subsequent execution and a simulation time consumed for execution of the reproduced I/F communication activity for each simulation step, the real time determined based on a real time difference between a start of the each simulation step and completion of synchronization with a co-simulator bus at an end of the each simulation step; and
   evaluating performance of ones of the simulation engines not replaced by the simulation engine repeater based on the performance of all of the co-simulation in the subsequent execution.

7. The non-transitory computer readable medium of claim 6, wherein the evaluating the performance of the ones of the simulation engines is based on a comparison of an integrated value of a ratio of the real time consumed and the simulation time consumed for the each simulation step for an engine of the ones of the simulation engines, and another integrated value of the ratio of the real time consumed and the simulation time consumed for the each simulation step for other engines of the ones of the simulation engines.

8. The non-transitory computer readable medium of claim 6, wherein the evaluating the performance of the ones of the simulation engines is conducted based on a ratio of the real time consumed and the simulation time consumed for the each simulation step of each of the ones of the simulation engines.

9. The non-transitory computer readable medium of claim 6, further comprising identifying a most time-consuming one of the ones of the simulation engines based on comparing a ratio of the real time consumed and the simulation time consumed for each of the ones of the simulation engines at a specified simulation timing.

10. The non-transitory computer readable medium of claim 6, further comprising evaluating the performance of the co-simulation based on comparing a ratio of the real time consumed and the simulation time consumed for all of the co-simulation, and a ratio of the real time consumed and the simulation time consumed for each of the plurality of simulation engines.

11. A host computer connected, via an interface (I/F) to a central processing unit (CPU) board comprising a memory configured to store firmware, a CPU configured to execute the firmware, and a timer configured to calculate event occurrence timing during execution of the firmware, the host computer comprising:
a processor configured to:
store interface (I/F) communication activity records of a plurality of simulation engines during execution of a co-simulation involving the plurality of simulation engines; and
for a subsequent execution of the co-simulation, replace one or more of the plurality of simulation engines with one or more corresponding simulation engine repeaters configured to reproduce I/F communication activity from the stored I/F communication activity records corresponding to the replaced one or more of the plurality of simulation engines during the subsequent execution of the co-simulation and to log a real time consumed for execution of the reproduced I/F communication activity in the subsequent execution and a simulation time consumed for execution of the reproduced I/F communication activity for each simulation step, the real time determined based on a real time difference between a start of the each simulation step and completion of synchronization with a co-simulator bus at an end of the each simulation step; and
evaluate performance of ones of the simulation engines not replaced by the simulation engine repeater based on the performance of all of the co-simulation in the subsequent execution.

12. The host computer of claim 11, wherein the processor is configured to evaluate the performance of the ones of the simulation engines based on a comparison of an integrated value of a ratio of the real time consumed and the simulation time consumed for the each simulation step for an engine of the ones of the simulation engines, and another integrated value of the ratio of the real time consumed and the simulation time consumed for the each simulation step for other engines of the ones of the simulation engines.

13. The host computer of claim 11, wherein the processor is configured to evaluate the performance of the ones of the simulation engines is conducted based on a ratio of the real time consumed and the simulation time consumed for the each simulation step of each of the ones of the simulation engines.

14. The host computer of claim 11, wherein the processor is configured to identify a most time-consuming one of the ones of the simulation engines based on comparing a ratio of the real time consumed and the simulation time consumed for each of the ones of the simulation engines at a specified simulation timing.

15. The host computer of claim 11, wherein the processor is configured to evaluate the performance of the co-simulation based on comparing a ratio of the real time consumed and the simulation time consumed for all of the co-simulation, and a ratio of the real time consumed and the simulation time consumed for each of the plurality of simulation engines.

* * * * *